(12) United States Patent
Mars et al.

(10) Patent No.: US 11,995,641 B2
(45) Date of Patent: May 28, 2024

(54) METHODS AND APPARATUS FOR FACILITATING NFC TRANSACTIONS

(71) Applicant: Ouraring Inc., San Francisco, CA (US)

(72) Inventors: Denis Mars, San Francisco, CA (US); Simon Ratner, San Francisco, CA (US)

(73) Assignee: Ouraring, Inc., San Francisco, CA (US)

( * ) Notice: Subject to any disclaimer, the term of this patent is extended or adjusted under 35 U.S.C. 154(b) by 0 days.

(21) Appl. No.: 18/349,029

(22) Filed: Jul. 7, 2023

(65) Prior Publication Data

US 2024/0005299 A1 Jan. 4, 2024

Related U.S. Application Data

(63) Continuation of application No. 17/516,301, filed on Nov. 1, 2021, now Pat. No. 11,699,143.

(60) Provisional application No. 63/108,218, filed on Oct. 30, 2020.

(51) Int. Cl.
*G06Q 20/32* (2012.01)
*H04B 5/48* (2024.01)
*H04B 5/72* (2024.01)

(52) U.S. Cl.
CPC ........... *G06Q 20/3278* (2013.01); *H04B 5/48* (2024.01); *H04B 5/72* (2024.01)

(58) Field of Classification Search
CPC .... G06Q 20/3278; G06Q 20/321; H04B 5/48; H04B 5/72
See application file for complete search history.

(56) References Cited

U.S. PATENT DOCUMENTS

| 10,524,123 B2* | 12/2019 | Freeman | A61B 5/0077 |
| 2016/0210613 A1* | 7/2016 | McGill | H04B 5/72 |
| 2021/0360342 A1* | 11/2021 | Curtis | H04R 5/0335 |
| 2021/0365931 A1* | 11/2021 | Shinohara | G06Q 20/065 |

* cited by examiner

*Primary Examiner* — Eugene Yun
(74) *Attorney, Agent, or Firm* — Holland & Hart LLP (57) ABSTRACT

A transaction device includes a transceiver for receiving a first message from a first smart device and a second message from a second smart devices at distances greater than a first distance, a processor for determining a first payload and first identifier for the first smart device from the first message and for determining a second payload and second identifier for the second smart device from the second message, an NFC device for receiving an NFC identifier from a smart device at a distance less than the first distance, wherein the processor is for determining whether the NFC identifier data matches the first identifier data or the second identifier data, for processing the first payload when the NFC identifier matches the first identifier data, and for processing the second payload when the NFC identifier matches the second identifier data.

20 Claims, 6 Drawing Sheets

METHODS AND APPARATUS FOR FACILITATING NFC TRANSACTIONS

CROSS REFERENCE

The present Application for Patent is a Continuation of U.S. patent application Ser. No. 17/516,301 by Mars et al., entitled "METHODS AND APPARATUS FOR FACILITATING NFC TRANSACTIONS," filed Nov. 1, 2021, which claims priority to U.S. Provisional patent application No. 63/108,218 by Mars et al., entitled "METHODS AND APPARATUS FOR FACILITATING NFC TRANSACTIONS," filed Oct. 30, 2020, each of which are expressly incorporated by reference herein.

BACKGROUND

The present invention relates to near field communications. More particularly, embodiments of the present invention relate to systems and methods of utilizing near-field communication (NFC) with increased performance.

The use of near-field communication (NFC) devices has become very popular with NFC enabled credit-cards, debit cards, employee badges or the like. In some examples, the NFC mechanism enables users to pay for items by simply placing their card near an NFC reader and holding it there until the data is read. Additionally, with the introduction of NFC payment services on smart devices (Apple Pay, Google Pay, Samsung Pay, and the like) users can pay for items when they only have their smart devices.

A drawback with the use of NFC in smart devices is that often the smart device will physically touch the NFC reader device and any pathogens (e.g. COVID 19) may be transferred between these devices. This is because users often hold and move their smart device near the NFC reader (causing contact between these devices) for an indeterminate amount of time—until the NFC reader beeps signaling completion. It is believed that users move their smart devices around because they are often uncertain if they are putting the smart device in the correct location. Often, in reality the smart device is in the right location, but transaction time is simply long.

In other cases, NFC is used to trigger interactions between the user of an NFC card and an NFC reader. This interaction typically first includes the identification of the NFC card, delivery of any amount of payload data, and the decryption and processing of this payload data by the NFC reader. Upon successful verification of the payload data, the NFC reader may perform one or more actions (e.g. depending upon permissions specified in the payload data, the time of day, and the like).

A drawback with such uses includes that the transfer time can be slow because of the amount of data transferred. For example, with a payload on the order of 1 Kbyte and a 100 kbits per second transfer rate, the payload transfer alone may take about 40 milliseconds to complete. On top of this, because the payload needs to be decrypted, the time for transfer and decryption of the payload data may be on the order of 100 to 150 milliseconds. Because of this latency and others, the inventors believe that the performance of the NFC reader system is slow, and may be improved.

In light of the above, what is desired are methods and apparatus for NFC transactions without the drawbacks described above.

SUMMARY

The present invention relates to near field communications. More particularly, embodiments of the present invention relate to systems and methods of utilizing near-field communication (NFC) with increases performance.

Embodiments of the present invention include an NFC reader device (e.g. smart reader) and a user smart device having both short-range communications capability and NFC capability. More particularly, NFC reader devices may be equipped with Bluetooth, BLE, ultra-wide band (UWB), ZigBee, WIFI, or the like transceivers. These short-range communications technologies are often included in existing or planned smart devices, such as smart phones, smart watches, smart glasses, smart rings, smart wearable devices and the like, that also have NFC capability.

In various embodiments, smart devices advertise their presence (e.g. advertisement signals) to smart readers via a short-range communications transceiver. Through initial contacts, the NFC reader device records identifiers (e.g. NFC identifiers) and pre-caches payload data (NFC payload data) for each of these smart devices. These operations are typically performed when the smart devices and the NFC reader device are farther apart than typical NFC range. Subsequently when a particular smart device enters NFC range of the NFC reader device. the NFC identifier of that smart device is transferred via the NFC channel. If the NFC reader determines that the NFC identifier was previously cached then the associated payload data that was also pre-cached is used by the NFC reader for the transaction. Accordingly, the NFC reader device need not wait for encrypted payload data to be passed via the NFC channel and does not need to wait for the payload data to be decrypted, saving time. In some current embodiments, it is expected that this reduces the NFC processing latency from 100 to 200 milliseconds and therefore improves the performance of the NFC reader.

According to one aspect a method is discloses. One process may include receiving via a first short-range transceiver in a sensor device, a plurality of message data from a plurality of smart devices at a plurality of distances greater than a first distance between the sensor device and the plurality of smart devices, wherein the plurality of smart devices includes a first smart device and a second smart device, and wherein a first message is received from the first smart device and a second message is received from the second smart device, and determining in a processor of the sensor device, first payload data and first identifier data associated with the first smart device in response to the first message data. One technique may include determining in the processor of the sensor device, second payload data and second identifier data associated with the second smart device in response to the second message data, receiving via an NFC transceiver in the sensor device, NFC identifier data from a smart device from the plurality of smart devices at a second distance less than the first distance between the sensor device and the smart device, and determining in the processor whether the initial NFC data matches the first identifier data or the second identifier data. A method may include processing in the processor the first payload data in response to a determination that the initial NFC data matches the first identifier data, and processing in the processor the second payload data in response to a determination that the initial NFC data matches the second identifier data.

According to another aspect a sensor device is described. One apparatus includes a first short-range transceiver configured to receive a plurality of message data from a plurality of smart devices at a plurality of distances greater than a first distance between the sensor device and the plurality of smart devices, wherein the plurality of smart devices includes a first smart device and a second smart device, and wherein a first message is received from the first smart device and a second message is received from the second smart device. A device may include a processor coupled to the first short-range transceiver, wherein the processor determines first payload data and first identifier data associated with the first smart device in response to the first message data, wherein the processor is configured to determine second payload data and second identifier data associated with the second smart device in response to the second message data, and an NFC transceiver coupled to the processor, wherein the NFC transceiver is configured to receive NFC identifier data from a smart device from the plurality of smart devices at a second distance less than the first distance between the sensor device and the smart device. In some systems a processor is configured to determine whether the initial NFC data matches the first identifier data or the second identifier data, the processor is configured to process the first payload data in response to a determination that initial NFC data matches first identifier data, and the processor is configured to process second payload data in response to a determination that the initial NFC data matches a second identifier data.

According to another aspect, a method is described. A technique may include receiving via a first short-range transceiver in a sensor device, a first message data from a first smart device while the sensor device is separated from the first smart device by a first distance greater than a first threshold distance, receiving via the first short-range transceiver in the sensor device, a second message data from a second smart device while the sensor device is separated from the second smart device by a second distance greater than the first threshold distance, determining in a processor of the sensor device, first payload data and first identifier data associated with the first smart device in response to the first message data, and determining in the processor of the sensor device, second payload data and second identifier data associated with the second smart device in response to the second message data, A method may include receiving via an near field communication (NFC) transceiver in the sensor device, NFC identifier data from a smart device while the sensor device is separated from the smart device by a third distance less than the threshold distance, and determining in the processor of the sensor device, whether the NFC identifier data is associated with the first smart device in response to first identifier data or is associated with the second smart device in response to the second identifier data. A process may include processing in the processor of the sensor device, the first payload data in response to a determination that the NFC identifier data is associated with the first smart device, and processing in the processor of the sensor device, the second payload data in response to a determination that the NFC identifier data is associated with the second smart device.

According to another aspect, a sensor device is disclosed. A system may include a first short-range transceiver configured to receive first message data from a first smart device when the sensor device and the first smart device are separated by a first distance that is greater than an NFC threshold distance, and wherein the first short-range transceiver is configured to receive second message data from a second smart device when the sensor device and the second smart device are separated by a second distance that is greater than the NFC threshold distance and a processor coupled to the first short-range transceiver, wherein the processor is configured to determine first payload data and first identifier data associated with the first smart device in response to the first message data, and wherein the processor is configured to determine second payload data and second identifier data associated with the second smart device in response to the second message data. A device may include a near field communication (NFC) transceiver coupled to the processor, wherein the NFC transceiver is configured to receive NFC identifier data from a smart device when the sensor device and the smart device are separated by a third distance that is within the NFC threshold distance. A apparatus may include a processor configured to determine whether the NFC identifier data is associated with the first smart device in response to the first identifier data, wherein the processor is configured to determine whether the NFC identifier data is associated with the second smart device in response to the second identifier data, wherein the processor is configured to process the first payload data in response to a determination that the NFC identifier data is associated with the first smart device, and wherein the processor is configured to process the second payload data in response to a determination that the NFC identifier data is associated with the second smart device.

A further aspect may include a method. A method may include receiving via a first short-range transceiver in a sensor device, a plurality of message data from a plurality of smart devices when the sensor device and the plurality of smart devices are separated by distances greater than an NFC threshold distance, wherein the plurality of smart devices includes a first smart device and second smart device, wherein the plurality of message data includes a first message and a second message, wherein the first message is received from the first smart device, and wherein the second message is received from the second smart device, determining in a processor of the sensor device, first payload data associated with the first smart device in response to the first message data, and determining in the processor of the sensor device, second payload data associated with the second smart device in response to the second message data. A process may include receiving via a near field communication (NFC) transceiver in the sensor device, NFC identifier data from a smart device from the plurality of smart devices when the sensor device and the smart device are separated by a distance less than the NFC threshold distance. A technique may include determining with the first short-range transceiver of the sensor device, a first signal strength of the first smart device, determining with the processor of the sensor device, whether the first signal strength exceeds a threshold signal strength, and processing in the processor the first payload data in response to determining with the processor that the first signal strength exceeds the threshold signal strength.

BRIEF DESCRIPTION OF THE DRAWINGS

In order to more fully understand the present invention, reference is made to the accompanying drawings. Understanding that these drawings are not to be considered limitations in the scope of the invention, the presently described embodiments are the presently understood best mode of the invention are described with additional detail through use of the accompanying drawings in which.

DETAILED DESCRIPTION

Figure 1A:
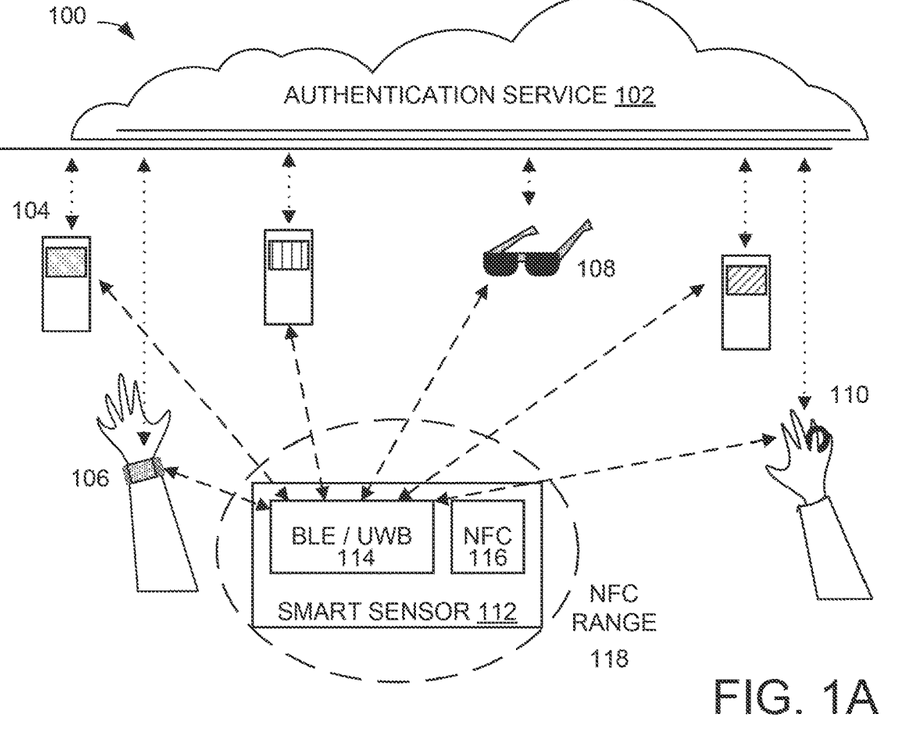
FIGS. 1A-1B illustrate system diagrams according to various embodiments.
Figure 1B:
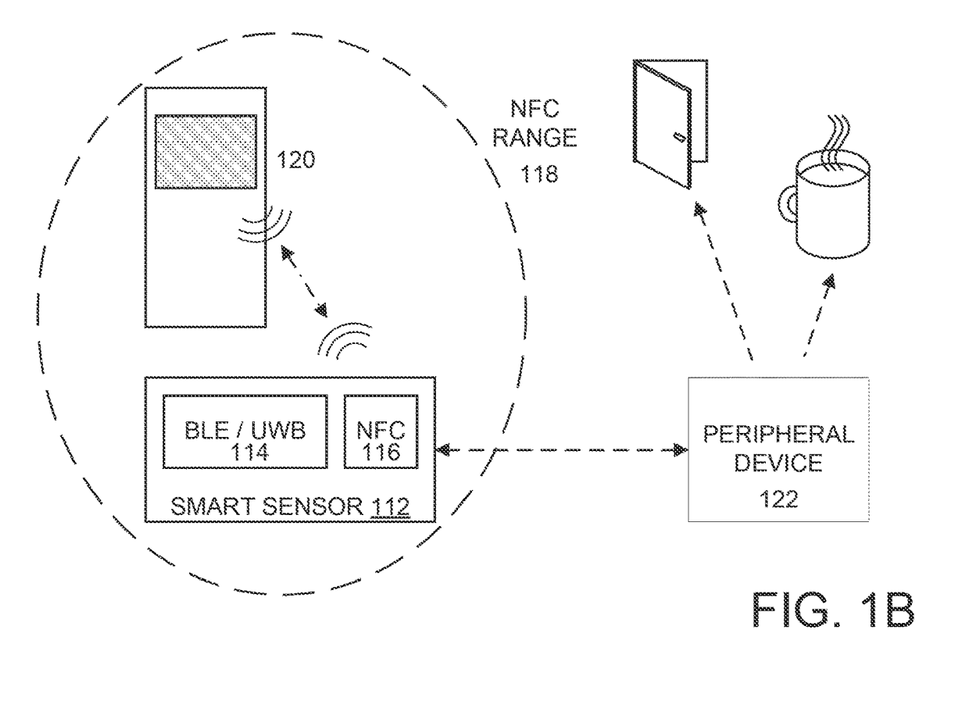

FIGS. 1A-1B illustrates a system diagram according to various embodiments. More specifically, FIGS. 1a-1B illustrate examples 100 of embodiments of the present invention. In FIG. 1A, an authentication service 102 is illustrated coupled to smart devices such as a smart phone 104, smart watch 106, smart tracker, smart glasses 108, smart headphones, smart rings 110, smart wearable devices, or the like. A smart reader or smart sensor 112 is illustrated having a short-range transceiver 114, such as Bluetooth, Bluetooth Low Energy (BLE), ultrawide band (UWB), Zigbee, or the like, and Near Field Communication (NFC) 116 channel. As illustrated, NFC 116 transmissions are typically limited to a certain threshold range or distance 118. This threshold may be based upon the strength of response from a smart device that includes NFC capability. In some embodiments, the threshold range may be from >0 CM, <10 cm, <20 cm, or the like, and may vary for each specific smart device.

As illustrated in FIG. 1A, smart devices may interact with authentication service 102, typically via wide area network transceivers, such as WIFI, Cellular (e.g. GSM, 4G, 5G), mesh network, or the like. As also shown, when smart devices are outside the defined NFC threshold range 118, these devices may interact with smart reader 112 via short-range transceiver 114.

In the embodiment illustrated in FIG. 1B, when a smart device 120 is within NFC range 118 (e.g. smart device 120 is within a threshold distance (e.g. 10 cm, etc.), a responsive rf signal from smart device 120 exceeds a threshold signal characteristic (e.g. amplitude, bit rate, etc.) smart device 120 and smart reader 112 is coupled to a peripheral device 122 that provides a tangible action to the user of smart device 120. In some examples, peripheral device 112 may be a controlled-access point, such as security door, gate, turnstile, a boarding gate, or the like; may be a service provider, such as a software subscription service, a computer login service, a point-of-sale (POS) system, and the like.

Figure 2A:
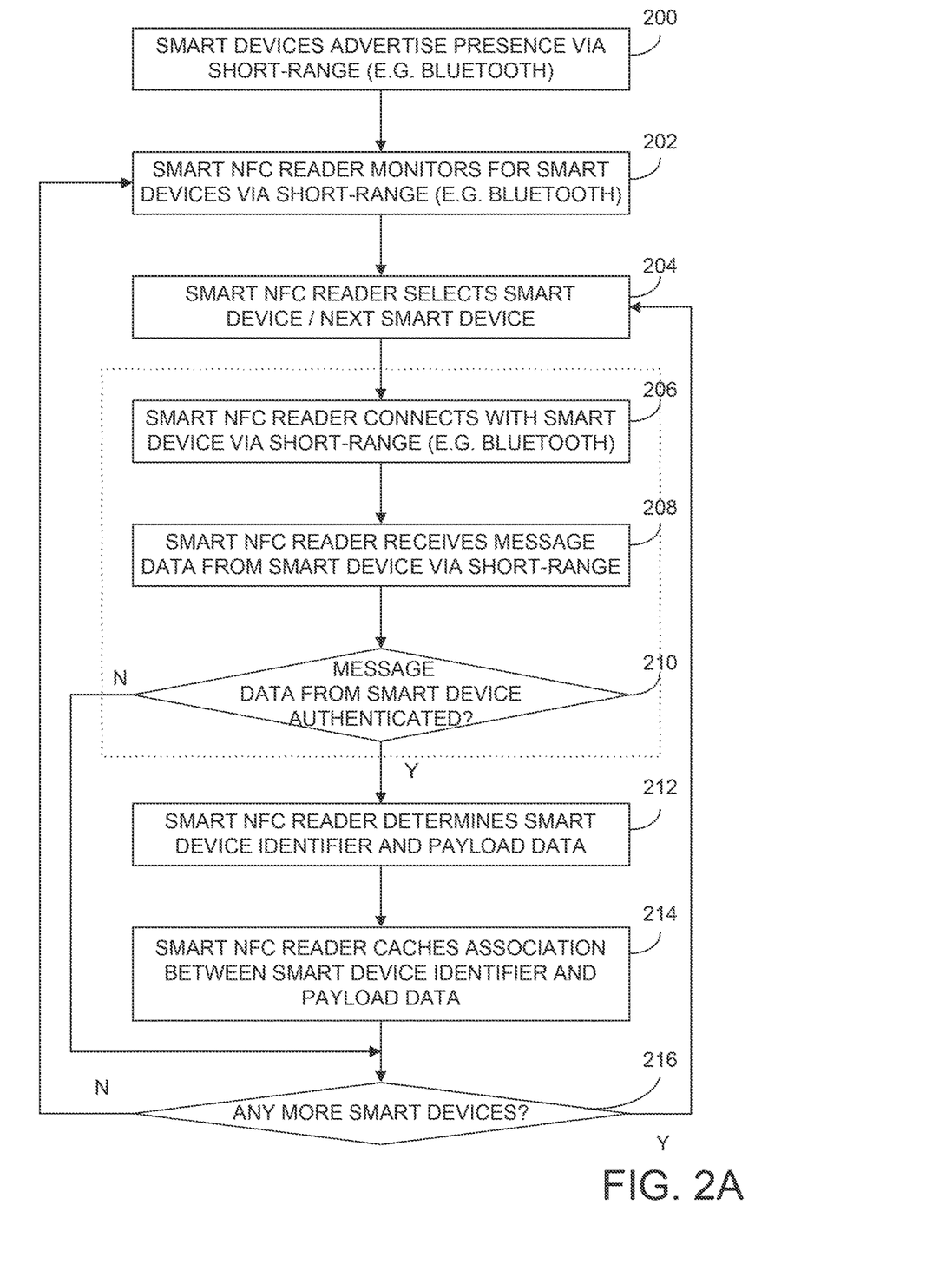
FIGS. 2A-B illustrates a block diagram of a process according to various embodiments.
Figure 2B:
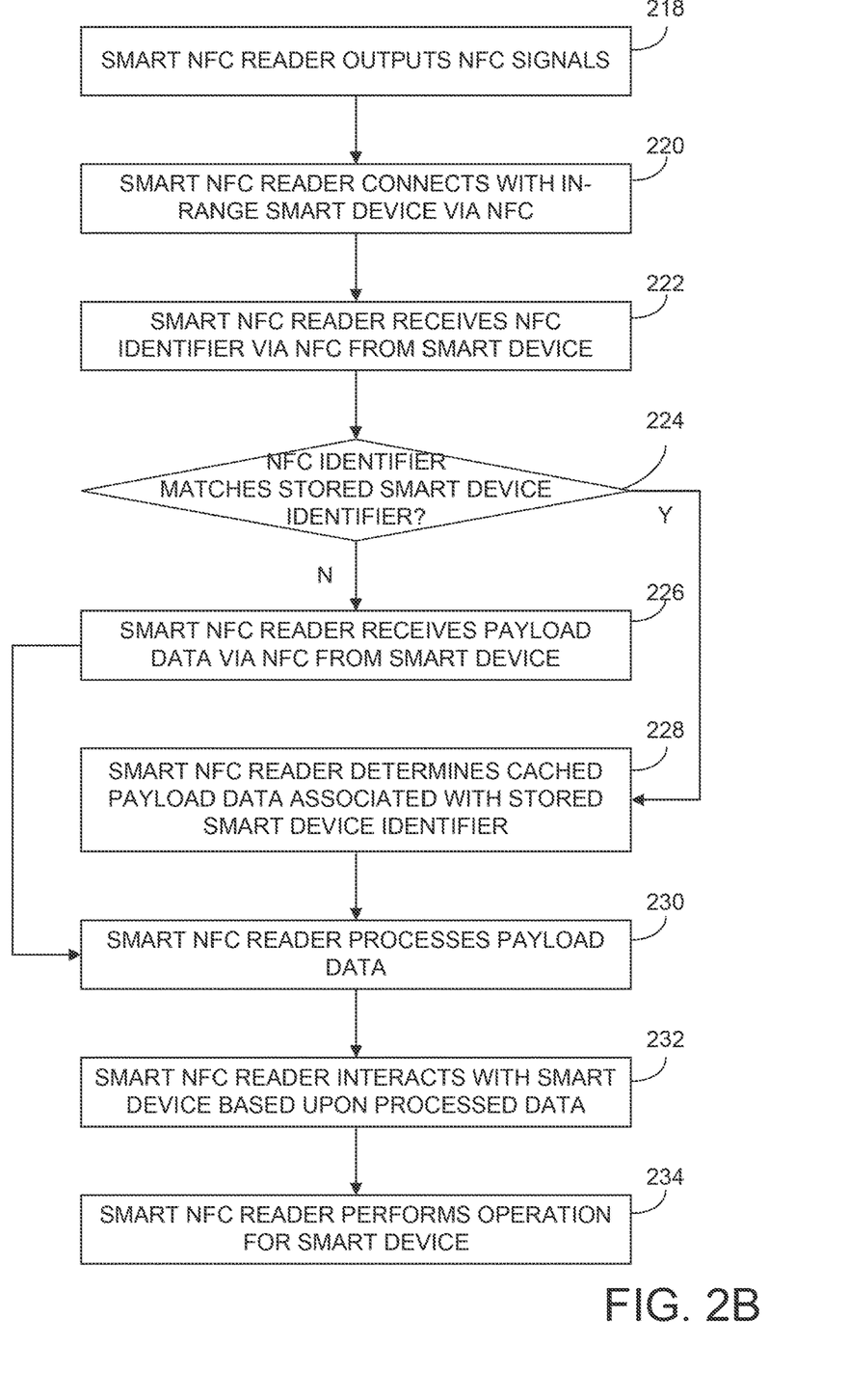

FIGS. 2A-2B illustrate a block diagram of a process according to various embodiments, For sake of convenience, reference to elements illustrated in FIGS. 1A-1B are provided. The processes in FIGS. 2A and 2B are typically asynchronous processes. In FIG. 2A, a smart reader 112 utilizes a short-range transceiver, such as BLE, to authenticate and build an associated table of smart device identifiers and payload data. In FIG. 2B, smart reader 112 utilizes NFC to receive NFC identifiers from smart devices and uses the associated table determine whether cached payload data can be used. As can be seen, these processes may be performed in parallel, at different times, or the like.

Initially in FIG. 2A, smart devices (e.g. 104) advertise their presence within a surrounding area, step 200. In specific examples, smart devices output ephemeral ID signals, i.e. identification signals that identify the smart devices for a short amount of time. These ephemeral ID signals are not-permanently associated with the smart devices thus it is an unreliable means to track smart devices via the use of the ephemeral ID signals. In some embodiments, an ephemeral ID signals may be Bluetooth MAC addresses, or the like, that periodically change.

As illustrated in FIG. 1A, it is contemplated that multiple smart devices will be in the vicinity of smart reader 112, and sensed by smart reader 112, step 202. As merely an example, if smart reader 112 is embodied as a self-check-out terminal at a store, there will typically be multiple users (and smart devices) queuing up to check out, which are within the range of the Bluetooth transceiver (or the like). In another embodiment, sensor 112 may be turnstile, or the like and multiple users (and smart devices) are queuing up to pass through the turnstile. In other embodiments, sensor 112 may be associated with other services.

Figure 3:
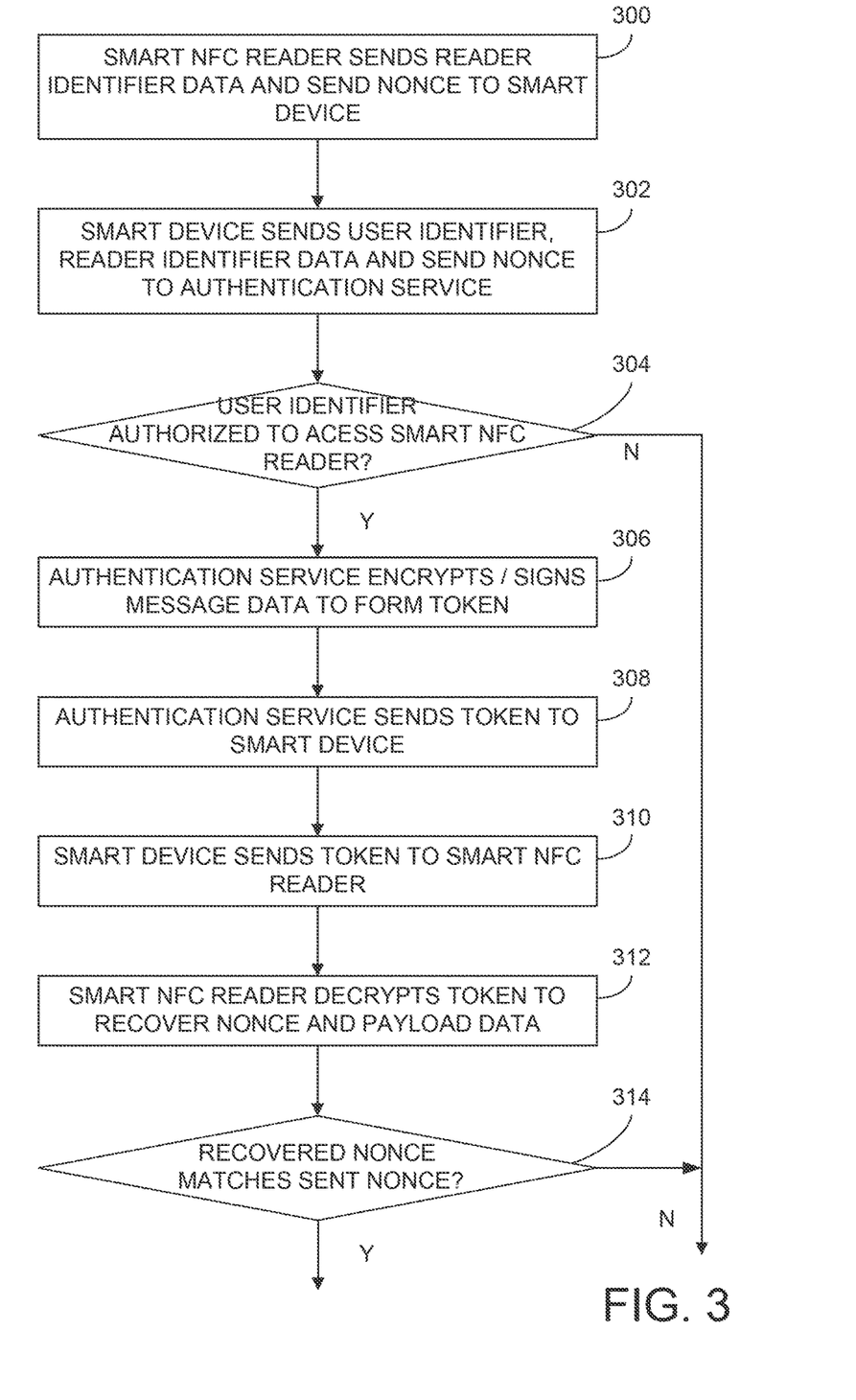
FIG. 3 illustrates another block diagram of a process according to various embodiments.

In response to the ephemeral ID signals, smart reader 112 may choose to communicate with any of the smart device sensed. In some embodiments, smart reader 112 may choose to communicate with the smart reader having the highest signal strength, or based upon any other criteria, step 204. In various embodiments, smart reader 112 communicates particular data to the smart device 104, step 206, and receives responsive message data from smart device 120, step 208. Smart reader 112 may then determine whether the received message data is authentic, step 210. In some embodiments, a user of smart device 104 may have to provide a fingerprint, facial image, passcode, or the like before the message data is unlocked in smart device 104 and provided to smart reader 112, accordingly, step 210 may not be needed. FIG. 3, below, discloses alternative embodiments of steps 206-210.

In various embodiments, if smart device 104 is authenticated, the message data received in smart reader 112 has been authenticated by authentication service 102, and belongs to the authorized user of smart device 104. Accordingly, an identifier associated with smart device 104, as well as payload data are determined, step 212. In some examples, the message data from smart device 104 is encrypted by authentication service 102 with a private key of authentication service 102, and smart reader 112 uses a public key of authentication service 102 to decrypt the message data. In some cases, the decrypted message data may include the smart device identifier (e.g. an NFC identifier) and the payload data (from the authentication service 102). In other examples, the message data from smart device 104, such as the smart device identifier and payload data. In still other examples, authentication service 102 need not be used, and the message data may be encrypted by smart device 104 or provided by a secure memory element from smart device 104.

In various embodiments, smart receiver 112 stores or caches in a memory an association between the smart device identifier and the payload data, step 214. In various examples, the smart device identifier may be static or partially dynamic. For example, a time stamp (e.g. an expiration time) may be included with a static identifier in the smart device identifier. In some embodiments, the expiration time may be 5 seconds, 1 minute, 10 minutes, or the like.

The process described above may be performed for other smart devices (e.g. 106, 108, 110) within the vicinity of smart NFC receiver 112, step 216. It is contemplated that throughout the day, various smart devices will be entering and leaving the (e.g. BLE) vicinity of smart receiver 112, thus caching data and clearing cache entries build a cache of up-to-date associations between smart device identifiers and payloads.

In some embodiments, it is contemplated that the processes illustrated in FIG. 2A can be performed without specific user intervention, and these steps may occur automatically in the background.

Referring to FIG. 2B, initially smart NFC reader (sensor) 112 outputs NFC signals via an NFC antenna/coil, or the like (electromagnetic fields, EMF), step 218. As illustrated in FIGS. 1A-1B, the NFC range 118 is typically much smaller than other short-range transceivers (e.g. Bluetooth, UWB, etc.). In some embodiments, the NFC threshold range 118 may be within a range of 3 to 10 cm (a distance less than which NFC communication may reliable occur), whereas Bluetooth and UWB have typical ranges of 10 to 100 m. Accordingly, in various embodiments, only when a smart device 120 is within NFC range 118 does smart device 120 provide sufficient backscattered electromagnetic fields (EMF), step 220. In some embodiments, the distance may be a function of the backscatter EMF strength, thus for example for one smart device, the distance may be 3 cm, for another smart device, the distance may be 5 cm, or the like. Accordingly, the threshold signal strength is not necessarily associated with a specific threshold distance. In such embodiments, the threshold distance may still be considered a short-hand indicator of a distance where there is a typical or nominally sufficient signal strength for typical smart devices.

In some embodiments, there is a threshold distance which NFC communications can be established between a smart NFC sensor device and a smart device. Typically at distances beyond this threshold distance, the smart device and the smart NFC sensor device may reliably communicate via short-range transceiver (e.g. Bluetooth, UWB, or the like), and within this distance, the smart device and the smart NFC sensor device may reliably communicate via NFC rf signals. In some embodiments, this threshold distance may be unique for each different smart device. Additionally, even the same smart phone may have different threshold distances because they are held in purses, in different cases, held near metal keys, and the like.

In various embodiments, an NFC identifier is typically returned from smart device 120 to smart reader 112 via NFC signals, step 222. The NFC identifier uniquely identifies smart device 120 to smart reader 112. In some embodiments, the NFC identifier may be static or may be partially dynamic. For example, a time component (e.g. expiration time) may be included with a static portion as part of the NFC identifier. In various embodiments, the NFC identifier may be the same as the smart device identifier determined in step 212 for a specific smart device, unless they have expired, as discussed above. In some embodiments, the NFC identifier and the smart device identifier determined in step 212 need not be the same, and may correlate in another manner, for example, the identifier in step 212 may be a hash, and compared to a hash of identifier in step 222, for example.

In some embodiments, the received NFC identifier is then compared to the cached list of smart device identifiers updated in step 214, step 224. If the received NFC identifier is not found on the cache, the NFC communication session continues, and NFC payload data is returned from smart device 120 to smart reader 112 via NFC signals, step 226. The amount of time for this step varies depending upon the size of the payload data. Additionally, the payload data typically needs preprocessing, e.g. decrypted. These steps may add from 100 to 200 milliseconds, if not more to the NFC transaction. In contrast, if the received NFC identifier is found on the cache, the associated cached payload data (see step 214) can be immediately used, step 228.

In various embodiments, smart reader 112 processes the payload data, step 230. The processing may include determining one or more identifiers associated with the user, e.g. loyalty card number, frequent flyer number, badge number, key number (e.g. for automobiles, lockers, etc.), financial identifier, device account number, and the like. Additionally, the processing may include determination of one or more options available to the user and may provide the options for the user to select, step 232. In some examples, the options may include, elevator floor numbers available to the user (e.g. hotel floor, employee floor), equipment available, or the like. Still further, the processing may include determination of specific configurations for the user. Examples of this may include which software programs and packages (e.g. Office, Creative Suite, etc.) are available to the user, which subscriptions (e.g. Netflix, Disney+, etc.) are available, and the like. In some examples, authorization may be automatically provided for subscription services via tokens, e.g. OAuth tokens, and the like.

In various embodiments, smart reader 112 directs a peripheral device to perform a tangible action for the user, step 234. In some cases, a default action may be take (e.g. opening ore enabling of a door, a gate, or a turnstile; flashing a green light; playing a default sound; starting an automobile, or the like; a default action specific to the user may be taken such as: enabling of a specific floor button on an elevator; automatically logging into a computer system; automatically logging into an on-line service (e.g. Adobe Creative Cloud, Hulu, or the like); and the like; and in other cases, based upon a selection of a user of available options, the selection action may be taken such as: vending of an item from multiple available items; providing an order to an ordering device or point-of-sale terminal (e.g. ordering a cup of coffee, or a snack); and the like. In light of the present patent disclosure, one of ordinary skill in the art will recognize may other types of payloads that be used in conjunction with the discloses embodiments. These are all within the scope of the patent disclosure.

In some embodiments, it is contemplated that the processes illustrated in FIG. 2B can be performed without specific user intervention, and these steps may occur automatically in the background.

FIG. 3 illustrates a block diagram according to some various embodiments of the present invention. More specifically, FIG. 3 illustrates a more detailed block diagram of steps 206-210, illustrated in FIG. 2A. As discussed in step 200, in FIG. 2A, smart devices provide an ephemeral ID to smart NFC reader 112 via short-range transceiver (e.g. BLE, UWB, etc.). In response, smart device 112 sends reader data (for example including a reader identifier, a nonce, a time stamp, and the like) back to a specific smart device, e.g. 104, step 300, again via short-range transceiver.

In various embodiments, an application provided by the assignee of the present patent disclosure may be running upon smart device 104. The application then sends the reader data as well as an identifier associated with the user of smart device 104 to authentication service 100, step 302. In various embodiments, authentication service 100 is remote, accordingly smart device 104 may use a wide area network (e.g. WIFI, 4G, 5G, GSM, cellular, mesh network, or the like) to communicate with authentication service 100.

In some embodiments, authentication service 100 determines based upon specified policies, or the like, whether the user is authorized to interact with smart reader 112, step 304. As an example of this, multiple employees may walk up to a controlled-access supply closet, but the policies specify that only employees within a particular job class are allowed to access supplies. If an employee within a different job class attempts to interact with smart reader 112, authentication service 100 may lookup the employee class and the identity of the reader and see that these classes of employees are not authorized to interact with smart reader 112. If they are not authorized, an unauthorized message, or the like may be returned to smart device 104, or no message may be returned at all.

In various embodiments, if the smart device 104 is authorized to interact with smart reader 112, authentication service may form a token, step 306. In some examples, the token may be a message that is signed or encrypted with a private key of authentication service 100. The message may include data such as the identifier of the reader, the nonce, the ephemeral ID associated with smart device 104, and the like. In some cases, authentication service 100 may also provide the NFC payload data in the message data. Such embodiments may be useful where it is undesirable to store NFC payload data in a relatively unprotected form within smart device 104. Such NFC payload data may also be stored in a secure memory element on the smart device and provided to the smart NFC sensor in step 228, above.

Next, in various embodiments, authentication service 100 returns the token to smart device 104, typically using the same wide area network channel, step 308. The token is then provided from smart device 104 to smart reader 112, typically using the same short-range communications channel, step 310. In some embodiments where the token does not include NFC payload data, in step 310, smart device 104 may retrieve the NFC payload data from a memory, and also send this NFC payload data within step 310. In some embodiments, the NFC payload data may be encrypted, or partially encrypted (partially decrypted) when it is provided to smart reader 112.

In some embodiments, smart reader 112 may receive an decrypt the received token, step 312. In some examples, smart reader 112 stores the public key associated with authentication service 100, and decrypts the token using the public key. If properly decrypted, the token may include decrypted data such as the reader identifier, the nonce, the ephemeral ID of the smart device, the NFC identifier, NFC payload, or the like. As discussed above, in some cases, the NFC payload and or NFC identifier may not be stored in the token and may be separately send from smart devices 104 to smart reader 112 via the short-range transceiver. In some embodiments, the recovered reader identifier and the recovered nonce may be used and compared to the reader identifier and the sent nonce, step 312. If they match, smart device 104 is authenticated, and the NFC payload data and NFC identifier are authentic.

In some embodiments, it is contemplated that the processes illustrated in FIG. 3 can also be performed without specific user intervention, and these steps may occur automatically in the background, under direction of software provided in part by the assignee of the present patent application.

Figure 4:
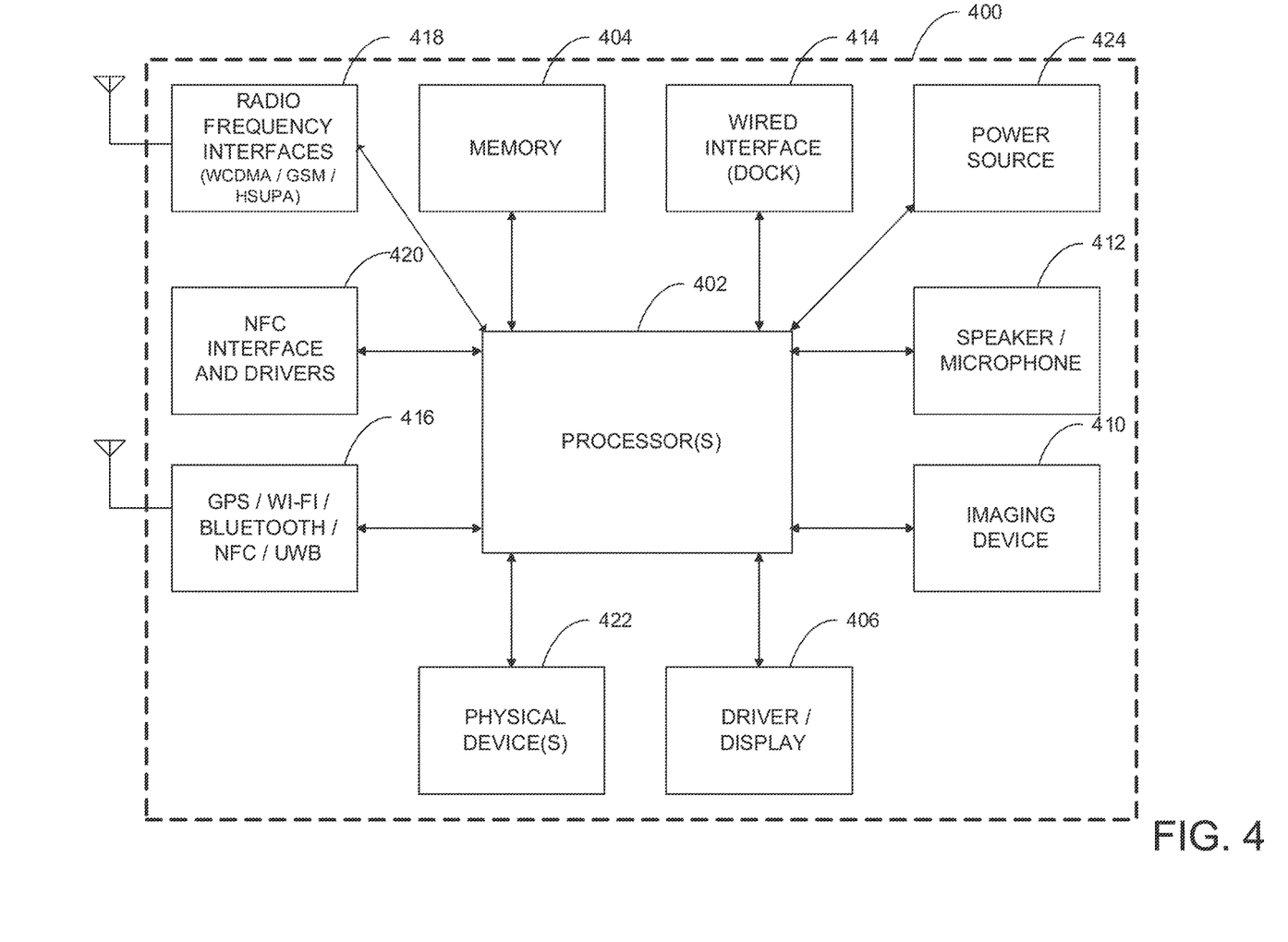
FIG. 4 is a block diagram illustrating an example of a system capable of implementing various processes in some embodiments.

FIG. 4 illustrates a functional diagram of various embodiments of the present invention. More specifically, it is contemplated that from NFC reader devices, smart devices to cloud-based servers may be implemented with a subset or superset of the below illustrated components. Additionally, it is contemplated that user smart devices (e.g. smart wearable devices, smart phones, tablets), computers (e.g. servers, laptops, etc.), cloud-based servers (e.g. hosting authentication services), display reader devices, ID reader devices, security modules etc. may be implemented with a subset or superset of the below illustrated components.

In FIG. 4, a computing device 400 may include some, but not necessarily all of the following components: an applications processor 402, memory 404, a display 406, an image acquisition device 410, audio input/output devices 412, and the like. Additional communications from and to computing device 400 can be provided by via a wired interface 414 (e.g. dock, plug, controller interface to peripheral devices); a GPS/Wi-Fi/Bluetooth interface/UWB 416; an NFC interface (e/g antenna or coil) an driver 418; RF interfaces and drivers 420, and the like. Also included in some embodiments are physical sensors 422 (e.g. (MEMS-based) accelerometers, gyros, magnetometers, pressure sensors, temperature sensors, bioimaging sensors etc.).

In various embodiments, computing device 400 may be a computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus Rift, HTC Vive, Sony Playstation VR, Magic Leap, Microsoft HoloLens); a wearable device (e.g. Motiv smart ring, smart headphones); an implanted device (e.g. smart medical device), a point of service (POS) device, a server, an ID reader or a security module provided by the assignee of the present patent disclosure, or the like. Typically, computing device 400 may include one or more processors 402, such processors 402 may also be termed application processors, and may include a processor core, a video/graphics core, and other cores. Processors 402 may include processor from Apple (A13, A14), Nvidia (Tegra), Intel (Core), Qualcomm (Snapdragon), Samsung (Exynos), ARM (Cortex), MIPS technology, a microcontroller, an embedded device, and the like. In some embodiments, processing accelerators may also be included, e.g. an AI accelerator, Google (Tensor processing unit), a GPU, or the like. It is contemplated that other existing and/or later-developed processors/microcontrollers ay be used in various embodiments of the present invention.

In various embodiments, memory 404 may include different types of memory (including memory controllers), such as flash memory (e.g. NOR, NAND), SRAM, DDR SDRAM, or the like. Memory 404 may be fixed within computing device 400 and ay also include removable memory (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, firmware, databases or the like. Additionally, in some embodiments, a secure device including secure memory and/or a secure processor may be provided. It is contemplated that other existing and/or later-developed memory and memory technology may be used in various embodiments of the present invention.

In various embodiments, display 406 may be based upon a variety of later-developed or current display technology, included LED or OLED displays and/or status lights; touch screen technology (e.g. resistive displays, capacitive displays, optical sensor displays, electromagnetic resonance, or the like); and the like. Additionally, display 406 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 406 may integrated into computing device 400 or may be separate. In some embodiments, display 406 may be in virtually any size or resolution, such as 4K resolution display, a micro display, one or more individual status or communication lights, e.g. LEDs, or the like.

In some embodiments of the present invention, acquisition device 410 may include one or more sensors, drivers, lenses and the like. The sensors may be visible light, infrared, and/or UV sensitive sensors, ultrasonic sensors, or the like, that are based upon any later-developed or convention sensor technology, such as CMOS, CCD, or the like. In some embodiments of the present invention, image recognition algorithms, image processing algorithms or other software programs for operation upon processor 402, to process the acquired data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In additional embodiments of the present invention, acquisition device 410 may provide user input data in the form of a selfie, biometric data, or the like.

In various embodiments, audio input/output 412 may include a microphone(s)/speakers. In various embodiments, voice processing and/or recognition software may be provided to applications processor 402 to enable the user to operate computing device 400 by stating voice commands. In various embodiments of the present invention, audio input 412 may provide user input data in the form of a spoken word or phrase, or the like, as described above. In some embodiments, audio input/output 412 may be integrated into computing device 400 or may be separate.

In various embodiments, wired interface 414 may be used to provide data or instruction transfers between computing device 400 and an external source, such as a computer, a remote service, a POS server, a local security server, a storage network, another computing device 400, a client device, a peripheral device to control (e.g. a security door latch, a turnstile latch, a gate, a status light, etc.), or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 414 may also provide operating electrical power, or the like to an optional internal power source 424, or the like. In other embodiments interface 414 may utilize close physical contact of device 400 to a dock for transfer of data, magnetic power, heat energy, light energy, laser energy or the like. Additionally, software that enables communications over such networks is typically provided.

In various embodiments, a wireless interface 416 may also be provided to provide wireless data transfers between computing device 400 and external sources, such as computers, storage networks, headphones, microphones, cameras, or the like. As illustrated in FIG. 4, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like.

GPS receiving capability may also be included in various embodiments of the present invention. As illustrated in FIG. 4, GPS functionality is included as part of wireless interface 416 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces in various embodiments. In various embodiments, RF interfaces 420 may support any future-developed or conventional radio frequency communications protocol, such as CDMA-based protocols (e/g/ WCDMA), GSM-based protocols, HSUPA-based protocols, G4, G5, or the like. In some embodiments, various functionality is provided upon a single IC package, for example the Marvel PXA330 processor, and the like. As described above, data transmissions between a smart device and the services may occur via Wi-Fi, a mesh network, 4G, 4G, or the like.

Although the functional blocks in FIG. 4 are shown as being separate, it should be understood that the various functionality may be regrouped into different physical devices. For example, some processors 402 may include the Bluetooth functionality. Additionally, some functionality need not be included in some blocks, for example, GPS functionality need not be provided in a physical device implementing other functions illustrated in block 516.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 406 and inputs/or outputs to physical sensors 422 may be processed in parallel processing threads. In other embodiments, such events or outputs may be processed serially, or the like. Inputs and outputs from other functional blocks may also be processed in parallel or serially, in other embodiments of the present invention, such as acquisition device 410 and physical sensors 422.

In some embodiments of the present invention, physical sensors 422 (e.g. MEMS-based) may include accelerometers, gyros, magnetometers, pressure sensors, temperature sensors, imaging sensors, (e.g. blood oxygen, heartbeat, blood vessel, iris data, etc.), thermometer, otoacoustic emission (OAE) testing hardware, and the like. The data from such sensors may be used to capture data associated with device 400, and a user of device 400. Such data may include physical motion data, pressure data, orientation data, or the like. Data captured by sensors 422 may be processed by software running upon processor 402 to determine characteristics of the user, e.g. gait, gesture performance data, or the like and used for user authentication purposes. In some embodiments, sensors 422 may also include physical output data, e.g. vibrations, pressures, and the like.

In some embodiments, a power supply 424 may be implemented with a battery (e.g. LiPo), ultracapacitor, or the like, that provides operating electrical power to device 400. In various embodiments, any number of power generation techniques may be utilized to supplement or even replace power supply 424, such a solar power, liquid metal power generation, thermoelectric engines, rf harvesting (e.g. NFC) or the like.

FIG. 4 is representative of components possible for a display reader, a smart NFC reader or sensor, a smart device, an authentication service server, a transaction service server, a security module and the like for embodying different embodiments. It will be readily apparent to one of ordinary skill in the art that may other hardware and software configurations are suitable for use with the present invention. Embodiments of the present invention may include at least some but need not include all of the functional blocks illustrated in FIG. 4. For example, a smart phone (e.g. access control device) may include most of the functions described above includes most if not all of the illustrated functionality. As another example, a wearable device, e.g. a smart ring (electronic devices enclosed in a ring-shaped shell, enclosure, or form factor), may include some of the functional blocks in FIG. 4, but it need not include a high-resolution display 430 or a touch screen, a speaker/microphone 460, wired interfaces 470, or the like. In still other examples, a cloud-based server or a virtual machine (VM) may not include image acquisition device 412, MEMs devices 422, GPS capability 416, and the like. Further components described above may be distributed among multiple computers, virtual machines, or the like. As further examples, an ID reader may include multiple radios (e.g. multiple Bluetooth radios, multiple UWB radios, or the like) but not include power generation functionality, a touch screen, or the like. Further, a security module may include multiple wired inputs (e.g. RJ45, RJ11, Wiegand, OSDP), but may not include a microphone, perturbation sensors (e.g. Accelerometer, gyroscope, etc.)

Figure 5:
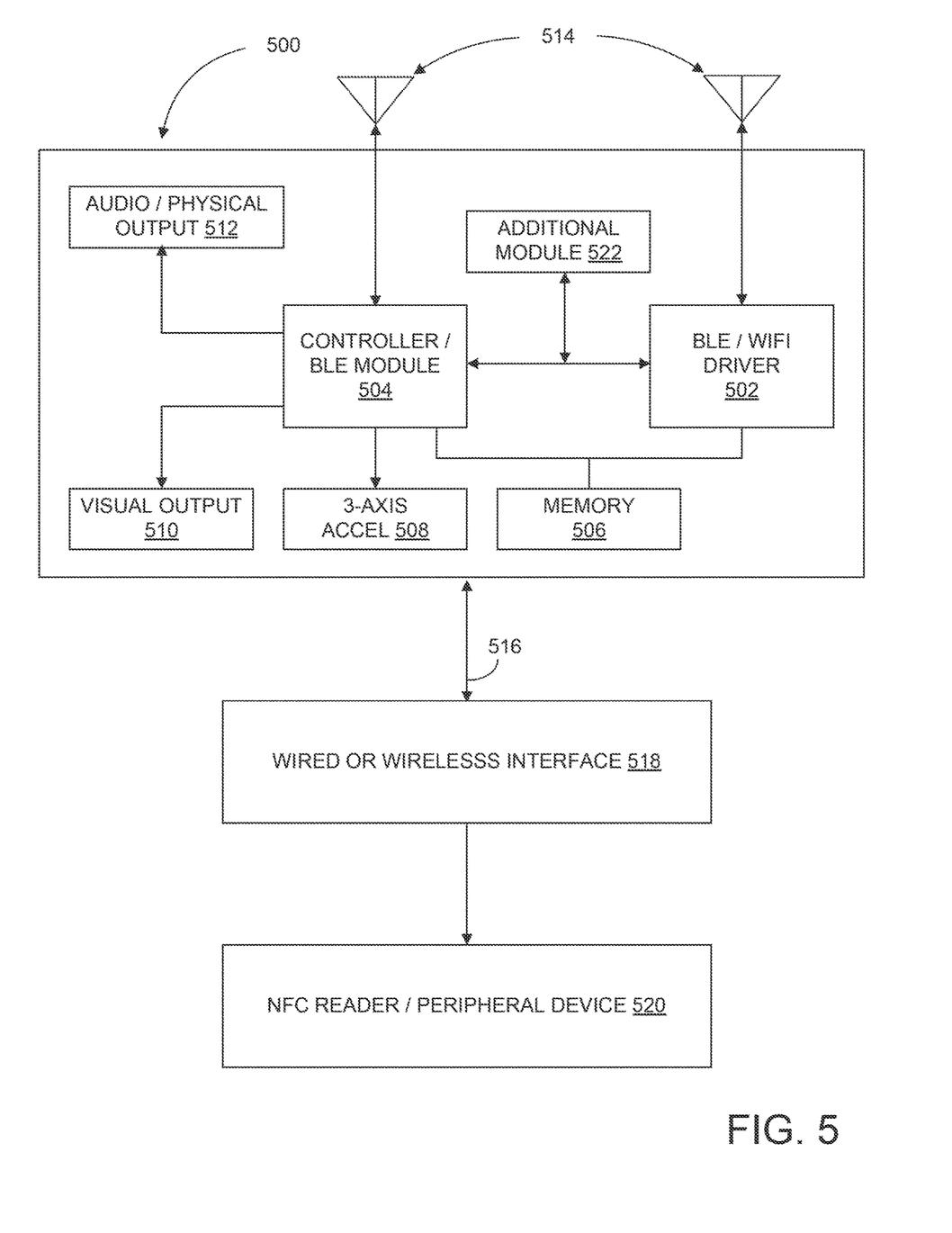
FIG. 5 is another block diagram of a portion of a reader according to various embodiments of the present invention.

FIG. 5 illustrates a block diagram according to some embodiments of the present invention. More specifically, FIG. 5 illustrates a block diagram of a short-range reader device 500 that may be included within an NFC smart reader device. Alternatively, reader device 500 may be coupled to an existing NFC reader device to provide the short-range transmissions discussed herein and illustrated in FIG. 1A. In some embodiments, device 500 includes an if control module 502, a controller 504, memory 506, an accelerometer 508, visual/haptic output 510, audio output 512, antennas 514, interface bus 516, and an interface module 518.

In operation, reader device 500 may perform the short-range communications of module 114 with smart devices, as illustrated in FIG. 1. (e.g. BLE, UWB, etc.). Device 500 may also perform the functions illustrated and discussed in FIG. 3, such as receiving a token from an authentication service and determining if the user is authorized to interact with the NFC smart reader.

In some embodiments, controller 504 may be embodied as a Nordic nRF52832 system on a chip, suitable for controlling Bluetooth low energy (BLE) communications and UWB communications, and for performing various functionalities described herein. Controller 504 may include a processor, such as a 42-bit ARM® Cortex®-M4F CPU and include 512 kB to 54 kB RAM. In various embodiments, other types of SoC controllers may also be used, such as Blue Gecko from Silicon Labs, CC2508 from TI, or the like. Controller 502 may be embodied a muRata 1LD Wi-Fi/BLE module, suitable for controlling Bluetooth low energy (BLE), Wi-Fi communications. Controller 502 may include a processor, such as a 42-bit ARM® Cortex®-M4. In various embodiments, other types of controllers may also be used, such as CYW43012 from Cypress, or the like. In some embodiments, modules 502 and 504 enable communication via short range communications protocols, such as BLE, ZigBee, WUB, Wi-Fi or the like. Modules 502 and 504 may also support mesh networking via BLE, Wi-Fi 5, or the like. In some embodiments, module 502 also supports Wi-Fi communications to communicate over a wide-area network (e.g. Internet).

In various embodiments, memory 506 may include non-volatile memory storing embodiments of the executable software code described herein. In some embodiments, the memory may be SRAM, Flash memory, or the like. In FIG. 5, audio/haptic output 512 is provided to give a user with audio feedback or haptic feedback and visual output 510 is provided to give a user visual feedback in response to the user approaching reader device 500. IN some embodiments, visual output 510 may be one or more LED lights having different colored outputs, may be a status display panel. The feedback may be provided to the user based upon an application running upon the smart device and interacting with reader device 500.

Accelerometer 528 is provided in some embodiments to determine whether reader device 500 is tampered with. For example, after installed and operable on a mounting location (e.g. on a wall), accelerometer 528 monitors the orientation of accelerometer 528 with respect to gravity. If a party attempts to remove reader device 500 from a mounting surface, accelerometer 528 will be able to sense the change in orientation. Based upon the change in orientation exceeding a threshold, a number of actions may be taken by reader device 500. One action may be to cease operation of reader device 500, another action may be to alert a remote server of the tampering, and the like. In other embodiments, other physical sensors, e.g. pressure sensors, light sensors, gyroscopes, and the like may be used. Such embodiments may also provide tamper detection indication.

In FIG. 5, interface 516 is used to couple reader device 500 to interface module 518. In various embodiments, interface module 518 interfaces with any number of external functional modules, e.g. NFC reader device, or the like. In one configuration, an external functional module 520 may be a peripheral device under NFC control, e.g. automatic door (e.g. a ADA-compliant automatic door), a television, a vending machine, a computer, an electronic panel, an automobile, a kiosk or the like; in another configuration, external functional module 520 may be an existing module that is configured to read conventional low frequency or high frequency (LF/HF/UHF/NFC etc.) based proximity cards or badges; and the like. In some embodiments, external reader module 520 may be an existing reader mounted upon a wall, or the like. In some embodiments, interface 516 may provide power to reader module 500, interface 516 may transmit data from reader device 500 to interface module 518 (e.g. credentials), provide power or the like.

In one configuration, rf control module 502 is not used, and only one antenna 514 is provided, or vice versa; in another configuration, modules 502 and 504 are both used, and two antennas 514 are used (one specifically for scanning for ephemeral IDs within a geographic region and one specifically for handling communications with a smart device). Such embodiments are particularly useful in high volume situations wherein one antenna may receive ephemeral IDs from many different smart devices (e.g. five users walking down a hall near a security door or vending machine), whereas the other antenna will provide the credentials and receive tokens from the specific users' smart devices who want to interact with the sensor (or reader) (e.g. to enter the security door, to receive a good, to access a computer, receive power or the like). In other embodiments, other channels may be used to provide the above communications, such as short-range Wi-Fi, ZigBee, NFC, ANT, UWB or the like.

In still another configuration, additional modules 522 may be provided to add additional functionality to reader module 500. In some embodiments, module 522 may be an if encoding module that converts data associated with the user (e.g. a badge number) into a format (e.g. LF/HF/UHF/NFC badge or tag) that is readable by a conventional RFID card or badge reader. In some embodiments, module 522 may include one or more biometric capture devices that capture biometric data of a user associated with a smart device, or that couple to biometric capture devices. In some embodiments, biometric data may include facial data, voice data, eye data (e.g. iris, retina, blood vessel), print data (e.g. fingerprints, palm print, blood vessel), movement data (e.g. signature, movement, gait), OAE profile, heartbeat data, and the like that may be used to facilitate authentication of the user.

Further embodiments can be envisioned to one of ordinary skill in the art after reading this disclosure. For example, in some embodiments, a smart device may be a ring, a smart watch, a fitness tracker, smart glasses, smart earbuds or earphones, a patch worn on the skin, smart phone and the like. Additionally, the smart NFC reader interacting with the smart device may be a smart tablet, a smart phone, a computer, a control access system, and the like. further, the cloud-based authentication service may provide service for one organization or multiple organizations and may be implemented as virtual machines, and the like. In light of the current patent disclosure, one of ordinary skill in the art will recognize other criteria that can be incorporated into alternative embodiments of the present invention.

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A reader device, comprising:
   a short-range communications component configured to communicate short-range communication signals;
   a near-field communications (NFC) component configured to communicate near-field communications signals; and
   one or more processors communicatively coupled to the short-range communications component and the NFC component, the one or more processors configured to:
      receive, via the short-range communications component at a first time, one or more short-range communications signals from one or more smart devices positioned within a first threshold range of the reader device, the one or more short-range communications signals comprising payload data associated with the respective one or more smart devices;
      cache the payload data associated with the one or more smart devices in memory;
      receive, via the NFC component at a second time subsequent to the first time, an NFC signal from a smart device positioned within a second threshold range of the reader device that is less than the first threshold range, the NFC signal comprising an NFC identifier associated with the smart device;
      process the payload data associated with the smart device based at least in part on the payload data and the NFC identifier being associated with the smart device; and
      generate one or more signals configured to cause the reader device, a peripheral device, or both, to perform a tangible action based at least in part on processing the payload data.

2. The reader device of claim 1, wherein the one or more processors are further configured to:
   receive, via the NFC component, a second NFC signal from a second smart device positioned within the second threshold range of the reader device, the second NFC signal comprising a second NFC identifier associated with the second smart device;
   determine an absence of payload data associated with the second smart device cached in the memory based at least in part on the second NFC identifier;
   receive, from the second smart device, one or more additional NFC signals via the NFC component based at least in part on determining the absence of payload data associated with the second smart device, the one or more additional NFC signals comprising additional payload data associated with the second smart device; and
   generate one or more signals configured to cause the reader device, the peripheral device, or both, to perform an additional tangible action based at least in part on processing the additional payload data.

3. The reader device of claim 1, wherein the one or more processors are further configured to:
   transmit a nonce to the smart device via the short-range communications component;
   receive a token associated with the smart device based at least in part on transmitting the nonce, wherein the token is encrypted via an authentication server that is communicatively coupled to the smart device, the reader device, or both; and
   authenticate the smart device based at least in part on decrypting the token, wherein processing the payload data, generating the one or more signals, or both, is based at least in part on authenticating the smart device.

4. The reader device of claim 3, wherein the one or more processors are further configured to:
   decrypt the token to generate a recovered nonce; and
   determine that the recovered nonce matches the nonce, wherein authenticating the smart device is based at least in part on determining that the recovered nonce matches the nonce.

5. The reader device of claim 1, wherein the smart device comprises a wearable device configured to collect biometric data from a user associated with the smart device, wherein the one or more processors are further configured to:
   authenticate the smart device based at least in part on biometric data collected via the smart device, wherein processing the payload data, generating the one or more signals, or both, is based at least in part on authenticating the smart device.

6. The reader device of claim 5, wherein the one or more smart device identifiers are associated with time duration that the payload data and respective one or more smart device identifiers will remain cached in memory.

7. The reader device of claim 5, wherein the smart device identifier comprises a hash of the NFC identifier, or vice versa.

8. The reader device of claim 1, wherein the one or more short-range communications signals further comprise one or more smart device identifiers associated with the one or more smart devices, the one or more smart device identifiers comprising a smart device identifier associated with the smart device, wherein the one or more processors are further configured to:
  cache the one or more smart device identifiers in the memory; and
  determine that the NFC identifier corresponds to the smart device identifier included within the one or more smart device identifiers cached in the memory, wherein processing the payload data associated with the smart device is based at least in part on determining that the NFC identifier corresponds to the smart device identifier.

9. The reader device of claim 1, wherein the one or more processors are further configured to:
  broadcast, via the short-range communications component, a first short-range communications signal within the first threshold range of the reader device, wherein receiving the one or more short-range communications signals is based at least in part on broadcasting the first short-range communications signal.

10. The reader device of claim 1, wherein the one or more processors are further configured to:
  transmit, via the NFC component, a first NFC signal within the second threshold range of the reader device, wherein receiving the NFC signal is based at least in part on transmitting the first NFC signal.

11. The reader device of claim 1, wherein the one or more short-range communications signals comprise Bluetooth signals, ultrawide band (UWB) signals, Zigbee signals, or any combination thereof.

12. The reader device of claim 1, wherein the tangible action comprises performing a transaction, opening a door, activating a controlled access point, activating a servo, raising a gate, enabling a device, vending a good, enabling a software service, logging into a device, or any combination thereof.

13. A smart device, comprising:
  a short-range communications component configured to communicate short-range communication signals;
  a near-field communications (NFC) component configured to communicate near-field communications signals; and
  one or more processors communicatively coupled to the short-range communications component and the NFC component, the one or more processors configured to:
    transmit one or more short-range communications signals to a reader device via the short-range communications component at a first time and based at least in part on the smart device being positioned within a first threshold range of the reader device, wherein the one or more short-range communications signals comprise payload data associated with the smart device, wherein transmitting the one or more; and
    transmit an NFC signal to the reader device via the NFC component at a second time subsequent to the first time and based at least in part on the smart device being positioned within a second threshold range of the reader device that is less than the first threshold range, the NFC signal comprising an NFC identifier associated with the smart device,
  wherein the reader device is configured to generate one or more signals based at least in part on the payload data, the one or more signals configured to cause the reader device, a peripheral device, or both, to perform a tangible action based at least in part on the NFC identifier and the payload data being associated with the smart device.

14. The smart device of claim 13, wherein the one or more processors are further configured to:
  receive a nonce from the reader device via the short-range communications component;
  transmit the nonce and a smart device identifier associated with the smart device to an authentication server;
  receive, from the authentication server, a token associated with the smart device based at least in part on transmitting the nonce, wherein the token is encrypted via the authentication server; and
  transmit the token to the reader device, wherein the reader device is configured to authenticate the smart device based at least in part on the token.

15. The smart device of claim 13, further comprising:
  a biometric data acquisition component, wherein the one or more processors are further configured to:
    acquire biometric data associated with a user associated with the smart device via the biometric data acquisition component; and
    authenticate the user based at least in part on the biometric data, wherein transmitting the one or more short-range communications signals, transmitting the NFC signal, or both, is based at least in part on authenticating the user.

16. The smart device of claim 13, wherein the one or more short-range communications signals further comprise a smart device identifier associated with the smart device, wherein the reader device is configured to generate the one or more signals based at least in part on the smart device identifier and the NFC identifier being associated with the smart device.

17. The smart device of claim 16, wherein the smart device identifier is associated with time duration that the payload data and smart device identifier will remain cached in a memory a the reader device.

18. The smart device of claim 16, wherein the smart device identifier comprises a hash of the NFC identifier, or vice versa.

19. The smart device of claim 13, wherein the one or more short-range communications signals comprise Bluetooth signals, ultrawide band (UWB) signals, Zigbee signals, or any combination thereof.

20. The smart device of claim 13, wherein the tangible action comprises performing a transaction, opening a door, activating a controlled access point, activating a servo, raising a gate, enabling a device, vending a good, enabling a software service, logging into a device, or any combination thereof.

* * * * *